United States Patent
Eschenbrenner et al.

(10) Patent No.: US 8,096,013 B2
(45) Date of Patent: Jan. 17, 2012

(54) WIPER

(75) Inventors: Nicolas Eschenbrenner, Fontoy (FR); Achim Kraus, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 336 days.

(21) Appl. No.: 12/159,055

(22) PCT Filed: Nov. 15, 2006

(86) PCT No.: PCT/EP2006/068510
§ 371 (c)(1),
(2), (4) Date: Jun. 24, 2008

(87) PCT Pub. No.: WO2007/080007
PCT Pub. Date: Jul. 19, 2007

(65) Prior Publication Data
US 2008/0313842 A1    Dec. 25, 2008

(30) Foreign Application Priority Data
Dec. 28, 2005   (DE) .......................... 10 2005 062 790

(51) Int. Cl.
*B60S 1/34*   (2006.01)
(52) U.S. Cl. ............. 15/250.34; 15/250.351; 403/359.1; 403/298; 403/4; 74/522; 29/428
(58) Field of Classification Search ............... 15/250.31, 15/250.34, 250.351, 250.352; 403/359, 298, 403/3, 4, 93; 74/522, 519; 29/428
See application file for complete search history.

(56) References Cited

U.S. PATENT DOCUMENTS

| | | | | |
|---|---|---|---|---|
| 2,286,035 A | * | 6/1942 | Horton et al. | 403/202 |
| 2,315,350 A | * | 3/1943 | Rappl | 403/254 |
| 2,856,212 A | | 10/1958 | Sacchini | |
| 3,161,902 A | | 12/1964 | Scinta | |
| 3,429,597 A | | 2/1969 | Krohm | |
| 5,412,833 A | * | 5/1995 | Hayden | 15/250.34 |
| 5,623,742 A | | 4/1997 | Journee et al. | |
| 5,774,928 A | * | 7/1998 | Schitter et al. | 15/250.34 |

OTHER PUBLICATIONS

PCT/EP2006/068510 International Search Report.

* cited by examiner

*Primary Examiner* — Gary Graham
(74) *Attorney, Agent, or Firm* — Michael Best & Friedrich LLP

(57) ABSTRACT

The present invention relates to a wiper having a wiper arm (1) and a fastening element (3), the fastening element (3) being fastened on the wiper arm (1), and the fastening element (3) having a hub (4) which can be plugged onto a drive shaft (5). Precision alignment of the wiper relative to the drive shaft (5) is made possible in that the fastening element (3) is plugged into a cutout (2) in the wiper arm (1) in a form-fitting manner in one of at least two possible alignments. A wiper constructed in this way is, in addition, compact.

20 Claims, 2 Drawing Sheets

WIPER

BACKGROUND OF THE INVENTION

The present invention relates to a wiper, in particular a wiper for a motor vehicle, and to a corresponding method for its alignment.

The prior art discloses wipers which are attached to drive shafts with frustoconical end sections. Formed on the frustoconical end section, which merges into a screw, is a knurling. The knurling of the frustoconical section engages into a corresponding knurling which is formed in a hub on an end of a wiper arm of the wiper. The knurling prevents a rotation of the wiper arm relative to the drive shaft. The screw on the end of the drive shaft projects out of the hub and engages into a nut, so that the wiper is fastened to the drive shaft and, on account of the knurlings which engage into one another, said wiper and drive shaft cannot rotate relative to one another.

The alignment of the wiper arm with respect to the drive shaft simultaneously determines the alignment of the wiper with the wiper blade relative to the windshield. In terms of production, an extensive standardization of certain components of wipers is desirable, which components can then be used for different motor vehicles. The wiper must then be aligned differently for different motor vehicles.

The precision of the alignment of the wiper is dependent here on the spacing of the grooves of the knurling. Here, a certain spacing of the grooves should not be undershot in order to ensure the load capacity of the wiper. The precision alignment of the wiper which can be obtained in this way has however proven to be insufficient in practice.

EP 0 673 813 B1 discloses a generic wiper which permits sufficient precision alignment of the wiper. The wiper has a wiper arm and a fastening element, with the fastening element being fastened to the wiper arm, and with the fastening element having a hub which can be plugged onto a drive shaft.

The precision alignment is obtained here by means of alignment discs which are positioned one above the other. On account of said alignment discs, however, the wiper is voluminous and heavy.

SUMMARY OF THE INVENTION

The present invention is based on the object of creating a wiper which is of compact construction and which permits precision alignment of the wiper relative to the drive shaft, and a corresponding method for the alignment of said wiper.

The object on which the invention is based is achieved by means of a wiper having the features of the characterizing part of patent claim 1 and a method for the alignment of said wiper having the features of the characterizing part of patent claim 5.

For a wiper according to the invention, the fastening element is inserted in a form-fitting manner, in one of at least two possible alignments, into a cutout in the wiper arm.

The volume of the wiper is advantageously reduced in that the fastening element is inserted into the wiper arm.

In a further preferred embodiment, the fastening element has, at the outer edge, a knurling which engages into a corresponding knurling on the edge of the cutout.

A knurling of said type is advantageously particularly suitable for a fine adjustment of the fastening element with respect to the wiper arm.

In a further preferred embodiment, the fastening element has, at the outer edge, two opposite knurlings which engage into two corresponding knurlings on the edge of the cutout.

Two such knurlings advantageously permit a particularly fine adjustment of the fastening element with respect to the wiper arm, which has an elongate shape.

In a further preferred embodiment, the edge of the hub has a knurling which can engage into a corresponding knurling of the drive shaft.

A knurling of said type advantageously permits a coarse alignment of the wiper.

BRIEF DESCRIPTION OF THE DRAWINGS

The invention is described in more detail below with reference to the drawings, in which.

DETAILED DESCRIPTION

Figure 1:
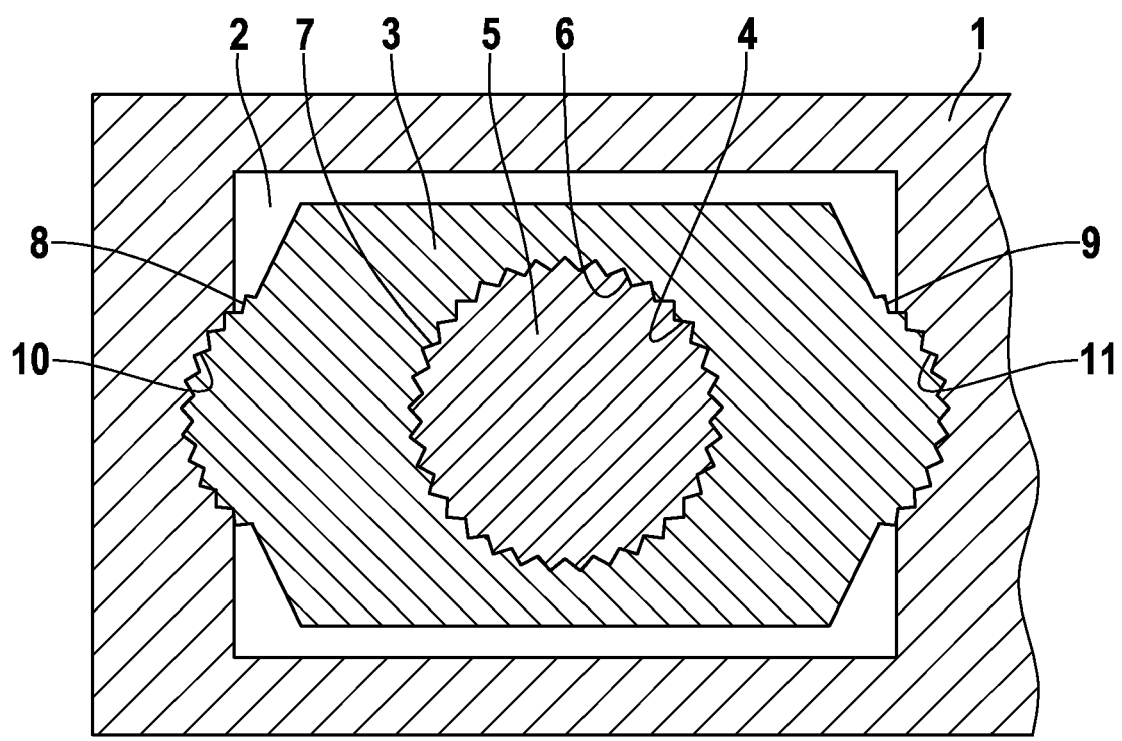
FIG. 1 shows a section view of a part of a wiper arm with a fastening element and a drive shaft.

FIG. 1 shows a section view of a part of the wiper arm 1, into the cutout 2 of which is inserted a fastening element 3 which has, in the center, a hub 4 which is plugged onto a drive shaft 5. Formed at the edge of the hub 4 is a knurling 6. Said knurling 6 engages into a corresponding knurling 7 of the drive shaft 5. The knurling 6 on the hub 4 permits the coarse adjustment of the wiper relative to the drive shaft 5 by virtue of the fastening element 3 being plugged onto the drive shaft 5 in one of many different positions. In practice, a precision of the angular position of the wiper relative to the drive shaft 5 of approximately 3° is to be obtained by means of the knurling 6. Here, the knurling 7 can engage fixedly into the knurling 6 of the fastening element 3 if the latter is composed of a soft material. The fastening element is then fastened not only in a form-fitting manner but also in a force-fitting manner to the drive shaft 5.

The fastening element 3 has the knurlings 8 and 9 on two opposite sides on the outer edge. The two knurlings 8 and 9 engage into two corresponding knurlings 10 and 11 on the edge of the cutout 2. The two knurlings 8 and 9 on the outer edge of the fastening element 3 are arranged along the wiper arm 1. On account of the elongate shape of the wiper arm, said arrangement makes it possible to create a relatively large spacing of the knurlings 8 and 9 on the outer edge of the fastening element 3. A large spacing between the knurlings 8 and 9 is necessary in order to obtain fine adjustment of the fastening element 3 with a predefined spacing between the grooves of the knurlings 8 and 9, since a certain spacing between the grooves of the knurlings 8 and 9 may not be undershot in order that the mechanical load capacity of the wiper is not reduced. In practice, a precision of the angular position of approximately 0.5° is to be obtained by means of the knurlings 8 and 9.

Figure 2:
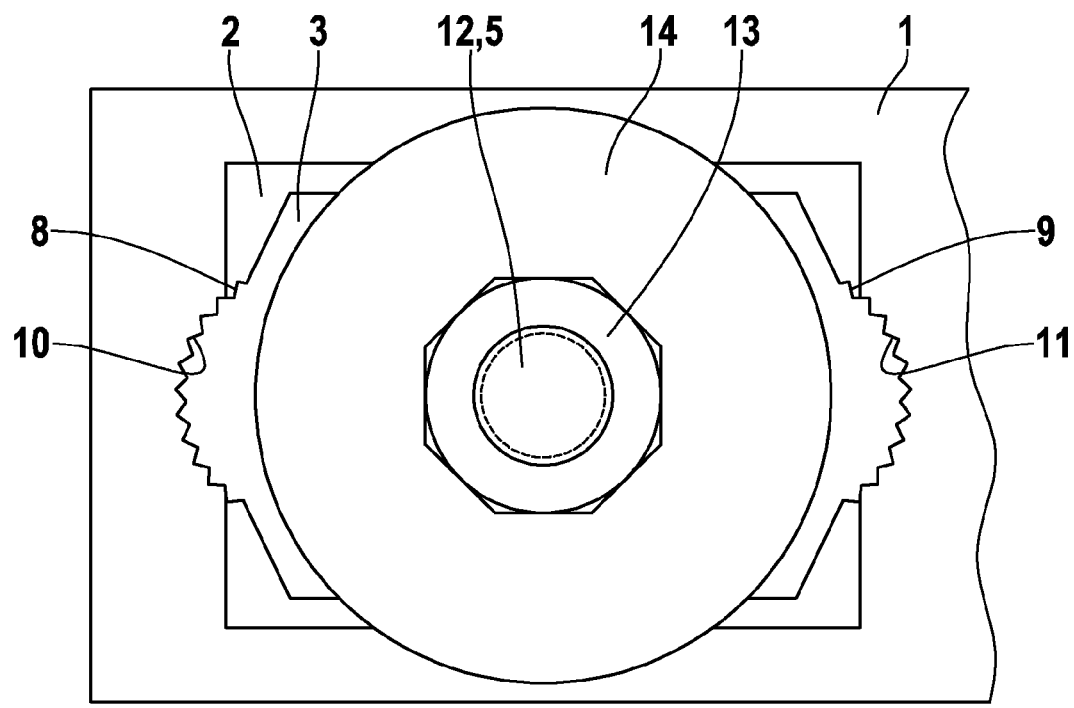
FIG. 2 shows a front view of the part of the wiper arm from FIG. 1.

FIG. 2 shows a front view of the part of the wiper arm 1 from FIG. 1. The drive shaft 5 merges into a screw 12 which is screwed into a nut 13. The nut 13 presses the washer 14 against the wiper arm 1 and the fastening element 3, which are in turn pressed against a frustoconical region of the drive shaft 5, as a result of which a movement of the wiper arm 1 and of the fastening element 3 along the drive shaft 5 is prevented, as shown further below with regard to FIG. 3. In contrast to this, the knurlings prevent a rotation of the wiper arm 1 and of the fastening element 3 about the drive shaft 5. In the region of the fastening element 3, the drive shaft 5 is preferably of cylindrical design.

Figure 3:
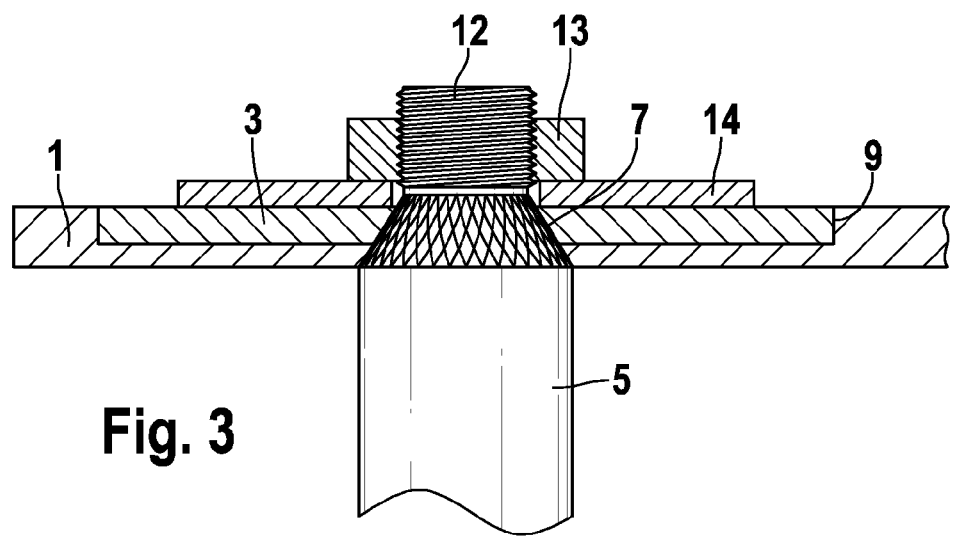
FIG. 3 shows a further section view of the part of the wiper arm from FIG. 1, perpendicularly with respect to the section view from FIG. 1.

FIG. 3 shows a further section view through the wiper arm 1, which section view runs perpendicularly to the section view from FIG. 1. The drive shaft 5 merges into the screw 12. Formed at the transition from the drive shaft 5 to the screw 12 is a frustoconical region, on the outer face of which is formed the knurling 7. The knurling 7 engages into the corresponding knurling 6 on the hub 4 (see FIG. 1) which is formed in the center of the fastening element 3. The underside of the cutout 2 is closed off, so that a hole with obliquely falling sides is also formed in the wiper arm 1, through which hole the drive shaft 5 runs. Here, the hole in the wiper arm 1 and the hub 4 in the fastening element 3 are matched to the obliquely falling sides of the frustoconical region of the drive shaft 5 in such a way that the movement of said drive shaft 5 is limited in one direction along the drive shaft, while the movement of said drive shaft 5 in the other direction is limited by the washer 14 which is retained by the nut 13. The knurlings 6, 8 and 9 of the fastening element 3 engage into the corresponding knurling on the edge of the cutout in the wiper arm 1 and of the drive shaft 5, in order to thereby prevent the rotation of the wiper arm 1 relative to the drive shaft 5.

During the attachment of the wiper to the drive shaft 5, it is possible either for firstly the fastening element 3 to be inserted into the wiper arm 1 and then for the wiper to be screwed to the drive shaft, or for firstly the wiper arm 1 and then the fastening element 3 to the plugged onto the drive shaft 5 before the wiper arm 1 with the fastening element 3 are fastened to the drive shaft 5 with the aid of the washer 14 and the screw 12.

The invention claimed is:

1. A wiper having a wiper arm (1) and having a fastening element (3), with the fastening element (3) being fastened to the wiper arm (1), and with the fastening element (3) having a hub (4) configured to be plugged onto a drive shaft (5) that merges into a screw which can be screwed into a nut for securing the fastening element and the wiper arm to the drive shaft, characterized in that the fastening element (3) is inserted in a form-fitting manner, in one of at least two possible alignments, into a cutout (2) in the wiper arm (1), in that the fastening element (3) has, at an outer edge, a knurling (8, 9) which engages into a corresponding knurling (10, 11) on an edge of the cutout (2), the outer edge of the fastening element (3) being positioned in facing relation with the edge of the cutout (2), the outer edge of the fastening element (3) having a portion with the knurling (8, 9) and another portion without a knurling, the portion with the knurling (8, 9) projecting from the portion without the knurling, the edge of the cutout (2) having a portion with the corresponding knurling (10, 11) and another portion without a corresponding knurling, the portion with the corresponding knurling (10, 11) being recessed into the portion without the corresponding knurling, and in that, in at least one alignment of the fastening element (3) in the cutout (2), a portion of the knurling (8, 9) on the fastening element (3) being disengaged from the corresponding knurling (10, 11) on the cutout (2).

2. The wiper as claimed in claim 1, characterized in that the fastening element (3) has, at the outer edge, two opposite knurlings (8, 9) which engage into two corresponding knurlings (10, 11) on an edge of the cutout (2).

3. The wiper as claimed in claim 2, characterized in that an edge of the hub (4) has a knurling (6) which can engage into a corresponding knurling (7) of the drive shaft (5).

4. The wiper as claimed in claim 1, characterized in that an edge of the hub (4) has a knurling (6) which can engage into a corresponding knurling (7) of the drive shaft (5).

5. The wiper as claimed in claim 1, characterized in that the fastening element (3) is pivotable about an axis, in that the knurling (8, 9) of the fastening element extends along an arc, and in that the portion of the outer edge of the fastening element (3) without a knurling extends substantially linearly from an end of the knurling (8,9) of the fastening element.

6. The wiper arm as claimed in claim 5, characterized in that the outer edge of the fastening element (3) has a first portion without a knurling extending substantially linearly from one end of the knurling (8,9) of the fastening element and a second portion without a knurling extending substantially linearly from another end of the knurling (8,9) of the fastening element.

7. The wiper as claimed in claim 1, characterized in that the fastening element (3) is pivotable about an axis, in that the corresponding knurling (10, 11) of the cutout extends along an arc, and in that the portion of the edge of the cutout (2) without a corresponding knurling extends substantially linearly from an end of the corresponding knurling (10,11) of the cutout.

8. The wiper as claimed in claim 7, characterized in that the edge of the cutout (2) has a first portion without a knurling extending substantially linearly from one end of the corresponding knurling (10,11) of the cutout, and a second portion without a corresponding knurling extending substantially linearly from another end of the corresponding knurling (10,11) of the cutout, the first portion and the second portion being substantially parallel.

9. The wiper as claimed in claim 8, characterized in that the knurling (8, 9) of the fastening element, extends along an arc, and in that the portion of the edge of the fastening element (3) without a knurling extends substantially linearly from an end of the of the knurling (8, 9) of the fastening element.

10. The wiper as claimed in claim 9, characterized in that the edge of the fastening element (3) has a first portion without a knurling extending substantially linearly from one end of the knurling (8,9) of the fastening element and a second portion without a knurling extending substantially linearly from another end of the knurling (8,9) of the fastening element, the first portion and the second portion being non-parallel.

11. The wiper as claimed in claim 1, characterized in that the portion of the outer edge of the fastening element (3) without the knurling and the portion of the edge of the cutout (2) without a corresponding knurling are positioned in spaced apart relation.

12. The wiper as claimed in claim 1, characterized in that the cutout (2) has a substantially rectangular shape.

13. A method for aligning a wiper having a wiper arm (1) and a fastening element (3), with the fastening element (3) being fastened to the wiper arm (1), and with the fastening element (3) having a hub (4) which is plugged in a form-fitting manner onto a drive shaft (5) that merges into a screw, the method comprising inserting the fastening element (3) in a form-fitting manner, in one of at least two possible alignments, into a cutout (2) in the wiper arm (1), and fastening the wiper arm to the drive shaft with a nut threaded onto the screw, in that the fastening element (3) has, at an outer edge, a knurling (8,9) which engages into a corresponding knurling (10, 11) on an edge of the cutout (2), the outer edge of the fastening element (3) having a portion with the knurling (8, 9) and another portion without a knurling, the portion with the knurling (8, 9) projecting from the portion without the knurling, the edge of the cutout (2) having a portion with the corresponding knurling (10, 11) and another portion without a corresponding knurling, the portion with the corresponding knurling (10, 11) being recessed into the portion without the corresponding knurling, and in that inserting the fastening element (3) includes inserting the fastening element (3) with the outer edge of the fastening element (3) positioned in facing relation with the edge of the cutout (2) and in at least one alignment of the fastening element (3) in the cutout (2) with a portion of the knurling (8, 9) on the fastening element (3) disengaged from the corresponding knurling (10, 11) on the cutout (2).

14. The method for aligning a wiper as claimed in claim 13, characterized in that the fastening element (3) has, at the outer edge, two opposite knurlings (8, 9) which engage into two corresponding knurlings (10, 11) on the edge of the cutout (2).

15. The method for aligning a wiper as claimed in claim 14, characterized in that an edge of the hub (4) has a knurling (6) which engages into a corresponding knurling (7) of the drive shaft (5).

16. The method for aligning a wiper as claimed in claim 13, characterized in that an edge of the hub (4) has a knurling (6) which engages into a corresponding knurling (7) of the drive shaft (5).

17. A wiper assembly comprising a wiper arm (1), a drive shaft (5) and a fastening element (3), with the fastening element (3) being fastened to the wiper arm (1), and with the fastening element (3) having a hub (4) plugged onto the drive shaft (5), the drive shaft merging into a screw which can be screwed into a nut for securing the fastening element and the wiper arm to the drive shaft, wherein the fastening element (3) is inserted in a form-fitting manner, in one of at least two possible alignments, into a cutout (2) in the wiper arm (1), in that the fastening element (3) has, at an outer edge, a knurling (8, 9) which engages into a corresponding knurling (10, 11) on an edge of the cutout (2), the outer edge of the fastening element (3) being positioned in facing relation with the edge of the cutout (2), the outer edge of the fastening element (3) having a portion with the knurling (8, 9) and another portion without a knurling, the portion with the knurling (8, 9) projecting from the portion without the knurling, the edge of the cutout (2) having a portion with the corresponding knurling (10, 11) and another portion without a corresponding knurling, the portion with the corresponding knurling (10, 11) being recessed into the portion without the corresponding knurling, and in that, in at least one alignment of the fastening element (3) in the cutout (2), a portion of the knurling (8, 9) on the fastening element (3) being disengaged from the corresponding knurling (10, 11) on the cutout (2).

18. The wiper assembly as claimed in claim 17, characterized in that the fastening element (3) has, at the outer edge, two opposite knurlings (8, 9) which engage into two corresponding knurlings (10, 11) on the edge of the cutout (2).

19. The wiper assembly as claimed in claim 17, characterized in that an edge of the hub (4) has a knurling (6) which can engage into a corresponding knurling (7) of the drive shaft (5).

20. The wiper assembly as claimed in claim 17, and further comprising a nut threaded onto the screw for securing the fastening element and the wiper arm to the drive shaft.

\* \* \* \* \*